US007930096B2

(12) United States Patent
Kubota et al.

(10) Patent No.: US 7,930,096 B2
(45) Date of Patent: Apr. 19, 2011

(54) NAVIGATION SYSTEMS, METHODS, AND PROGRAMS

(75) Inventors: Tomoki Kubota, Okazaki (JP); Hidefumi Okabe, Anjo (JP)

(73) Assignee: Aisin AW Co., Ltd., Anjo (JP)

(*) Notice: Subject to any disclaimer, the term of this patent is extended or adjusted under 35 U.S.C. 154(b) by 456 days.

(21) Appl. No.: 11/481,024

(22) Filed: Jul. 6, 2006

(65) Prior Publication Data
US 2007/0010938 A1    Jan. 11, 2007

(30) Foreign Application Priority Data
Jul. 8, 2005    (JP) ................. 2005-200394

(51) Int. Cl.
*G01C 21/00*    (2006.01)
(52) U.S. Cl. ............................. 701/200; 701/1; 340/575
(58) Field of Classification Search ............... 701/1, 96, 701/200; 340/439, 575
See application file for complete search history.

(56) References Cited

U.S. PATENT DOCUMENTS

| 6,370,471 | B1 * | 4/2002 | Lohner et al. ............ 701/96 |
| 6,577,334 | B1 * | 6/2003 | Kawai et al. ............. 348/148 |
| 6,859,728 | B2 * | 2/2005 | Sakamoto et al. ......... 701/211 |
| 6,980,098 | B2 * | 12/2005 | Shinada et al. ........... 340/439 |
| 2002/0116156 | A1 * | 8/2002 | Remboski et al. ......... 702/188 |

FOREIGN PATENT DOCUMENTS

| JP | A-11-78729 | 3/1999 |
| JP | A-2001-163082 | 6/2001 |
| JP | A-2003-057059 | 2/2003 |
| JP | A-2004-50890 | 2/2004 |
| JP | A-2004-171060 | 6/2004 |
| JP | A-2004-352176 | 12/2004 |

OTHER PUBLICATIONS

Sep. 27, 2010 Office Action in Japanese Application No. 2005-200394, with translation.

* cited by examiner

*Primary Examiner* — Mark Hellner
*Assistant Examiner* — Helal A Algahaim
(74) *Attorney, Agent, or Firm* — Oliff & Berridge, PLC (57) ABSTRACT

Navigation systems, methods, and programs provide appropriate driving guidance to a driver according to the level of the driving skills of the driver. The navigation systems, methods, and programs identify that the vehicle is in a predetermined specified condition based on information detected by a condition detecting device and detect an actual vehicle control state under the specified conditions based on information detected by an actual state detecting device. The systems, methods, and programs specify an appropriate vehicle control state according to the specified conditions. The systems, methods, and programs determine the level of the driving skills of a driver of the vehicle under the specified conditions based on the actual vehicle control state and the appropriate vehicle control state and output driving guidance according to the determined level of the driving skills under the specified conditions.

22 Claims, 8 Drawing Sheets

NAVIGATION SYSTEMS, METHODS, AND PROGRAMS

INCORPORATION BY REFERENCE

The disclosure of Japanese Patent Application No. 2005-200394, filed on Jul. 8, 2005, including the specification, drawings and abstract is incorporated herein by reference in its entirety.

BACKGROUND

1. Related Technical Fields

Related technical fields include navigation systems and navigation methods that provide driving guidance according to the level of the driving skills of the driver.

2. Description of Related Art

Japanese Patent Application Publication No. JP-A-2003-57059 discloses a navigation system that simplifies the audio guidance for each road depending on the number of times that each road has been traveled. Because the driver does not need rod guidance for roads that have been traveled frequently, the navigation system disclosed in the above publication can decrease the annoyance felt by the driver that is caused by unnecessary road guidance being output by the navigation system.

SUMMARY

However, there are cases in which driving assistance for smoothly traveling on a road is necessary even when a driver knows the road well. For example, when the vehicle will enter the highway main traffic lanes, providing appropriate driving guidance to a driver who has a low level of driving skills may be desirable. In addition, for example, when the driver is changing lanes or parking, providing appropriate driving guidance to a driver who has a low level of lane-changing skills or parking skills may be desirable.

Navigation systems, methods, and programs may provide appropriate driving guidance to a driver according to the level of the driving skills of the driver. Navigation systems, methods, and programs may identify that the vehicle is in a predetermined specified condition based on information detected by a condition detecting device and may detect an actual vehicle control state under the specified conditions based on information detected by an actual state detecting device. The systems, methods, and programs may specify an appropriate vehicle control state according to the specified conditions. The systems, methods, and programs may determine the level of the driving skills of a driver of the vehicle under the specified conditions based on the actual vehicle control state and the appropriate vehicle control state and may output driving guidance according to the determined level of the driving skills under the specified conditions.

BRIEF DESCRIPTION OF THE DRAWINGS

Exemplary implementations will now be described with reference to the accompanying drawings, wherein.

DETAILED DESCRIPTION OF EXEMPLARY IMPLEMENTATIONS

Below, exemplary implementations of the broad principles described herein are explained based on an example in which the principles are applied to assistance for merging into the highway main traffic lanes.

Figure 2:
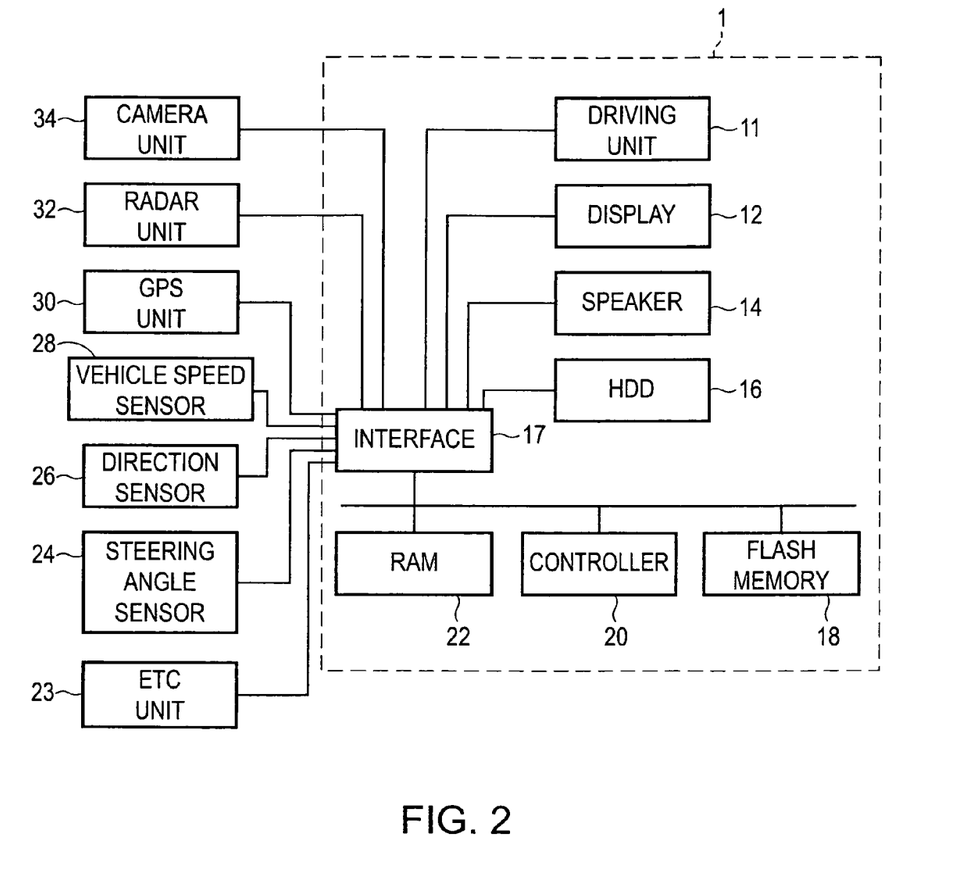
FIG. 2 shows an exemplary navigation system.

FIG. 2 is a block diagram showing an exemplary hardware configuration of a navigation system including a navigation device 1. The navigation system may be installed on a vehicle such as, for example, an automobile, a truck, or a motorcycle.

A map database (map DB) is stored in a memory 16, such as, for example, hard disk apparatus (HDD). Map data for the vicinity of the vehicle may be obtained by the navigation system communicating with, for example, a traffic information center.

A direction sensor 26, which may serve as a condition detecting device, may include a geomagnetic sensor, a right and left wheel speed difference sensor, a vibration gyroscope, a gas-rate gyroscope, an optical fiber gyroscope, which may be used in dead-reckoning navigation (as opposed to GPS navigation).

A vehicle speed sensor 28, which may serve as a condition detecting device and/or an actual state detecting device, may include a vehicle speed sensor that is used in the detection of the vehicle speed and dead-reckoning navigation, and may, for example, be shared with a speedometer. By integrating the speed as a function of time, the traveled distance may be found. The speed sensor, for example, may use the vehicle wheel rotation speed, may be structured by a Doppler ground speed sensor that uses electromagnetic waves or ultrasound, or may be a ground speed sensor that uses light and space filters.

A GPS unit 30, which may serve as a condition detecting device, may be structured, for example, by an antenna that receives orbital data sent from satellites used in satellite navigation and an ASIC for outputting latitude and longitude data for the current position of the vehicle. Based on the latitude and longitude data for the current position of the vehicle and the latitude and longitude attributes of the node corresponding to the highway merging point recorded in the map DB, it may be possible to detect a condition in which the vehicle will presently enter a highway.

As used herein, the term "link" refers to, for example, a road or portion of a road. For example, according to one type of road data in the map DB, each road may consist of a plurality of componential units called links. Each link may be separated and defined by, for example, an intersection, an intersection having more than three roads, a curve, a highway entry point, and/or a point at which the road type changes. As used herein the term "node" refers to a point connecting two links. A node may be, for example, an intersection, an intersection having more than three roads, a curve, a highway entry point, a dead end and/or a point at which the road type changes.

A radar unit 32, which may serve as a condition detecting device and/or an actual state detecting device, may be structured, for example, by an optical radar and/or an electromagnetic radar, and may detect the position of nearby vehicles with respect to the driver's vehicle. By differentiating the change in position of the nearby vehicles with respect to the driver's vehicle as a function of time, it is possible to find the forward travel direction and speed of the nearby vehicles.

A camera unit 34, which may serve as a condition detecting device and/or an actual state detecting device, may be structured by a digital camera, such as, for example, a CCD camera and/or a CMOS camera, which may be used in lane marker recognition. The camera unit 34 may take images of the lane markers in order to specify the lane in which the vehicle is traveling, for example, by taking images of the road surface in front and in back of the driver's vehicle. The camera unit 34 may photograph the highway entrance/exit ramp divider area, which indicates the area where merging into the highway main traffic lanes is prohibited. The camera unit 34 may photograph adjacent vehicles by taking images in the side direction of the driver's vehicle.

The lane in which the vehicle is traveling may also be detected, for example, by recognizing lane markers that are in the form of an inductive cable system, a magnetic marker system, and/or a reflector system.

A steering angle sensor 24, which may serve as an actual state detecting device and/or a condition detecting device, may be structured by a non-contact type rotation angle sensor that uses, for example, magnetism or light, and detects the absolute steering angle of the steering wheel. By tracking the absolute steering angle, it is possible to detect, for example, the timing at which the vehicle will enter the main traffic lanes from the acceleration lane, the timing at which the merging into the main traffic lanes will be complete, and/or the collision avoidance operation in which the vehicle returns to the acceleration lane after attempting to merge into the main traffic lanes.

An ETC unit 23, which may function as a condition detecting device, may include, for example, an antenna and ASIC in order to communicate with the communication system provided at entrance/exit toll gates on a toll road. The ETC unit 23 may obtain the toll data from the communication system provided at the entrance/exit tollgates of the highway, and may subtract the toll from the prepayment data. The toll data depends on the zones of the toll road through which the vehicle has traveled. By detecting communication between the ETC unit 23 and the entrance tollgate of the highway, it is possible to detect the condition in which the vehicle will presently enter a highway.

A display 12, which may be part of the navigation device 1, may be structured by, for example, a flat panel display (FPD) and/or a heads-up display (HUD). The display 12 may be used to display the driving guidance, maps, and/or travel route guidance.

A speaker 14, which may be part of the navigation device 1, may be used to output guidance audio about driving and a travel route. The speaker 14 may be jointly used by an audio system or the speaker 14 may be dedicated to navigation.

An interface 17 may be structured by, for example, an AD converter and/or a DA converter and may carry out the conversion of the various signals between the different types of input/output units described above and a controller 20, such as, for example, a CPU.

A RAM 22 may temporarily store data to be processed, processed data, and/or programs executed by the controller 20.

A flash memory 18 may be a non-volatile memory, such as, for example, an EEPROM, that stores the control programs that are executed by the controller 20. In addition, the flash memory 18 may store data that must be saved when the electrical power supply to the navigation device 1 is interrupted. The settings of the guidance mode and the level of the driving skills of the driver, for example, may be included in such data. The control program and similar data may also be stored in the memory 16. The control programs and the map DB may be stored in the flash memory 18 and/or the memory 16 by being, for example, downloaded via the network of a predetermined server or by being read from a computer readable recording medium such as a removable memory (not illustrated).

The controller 20 may control one or more units of the navigation system by executing control programs.

Figure 3:
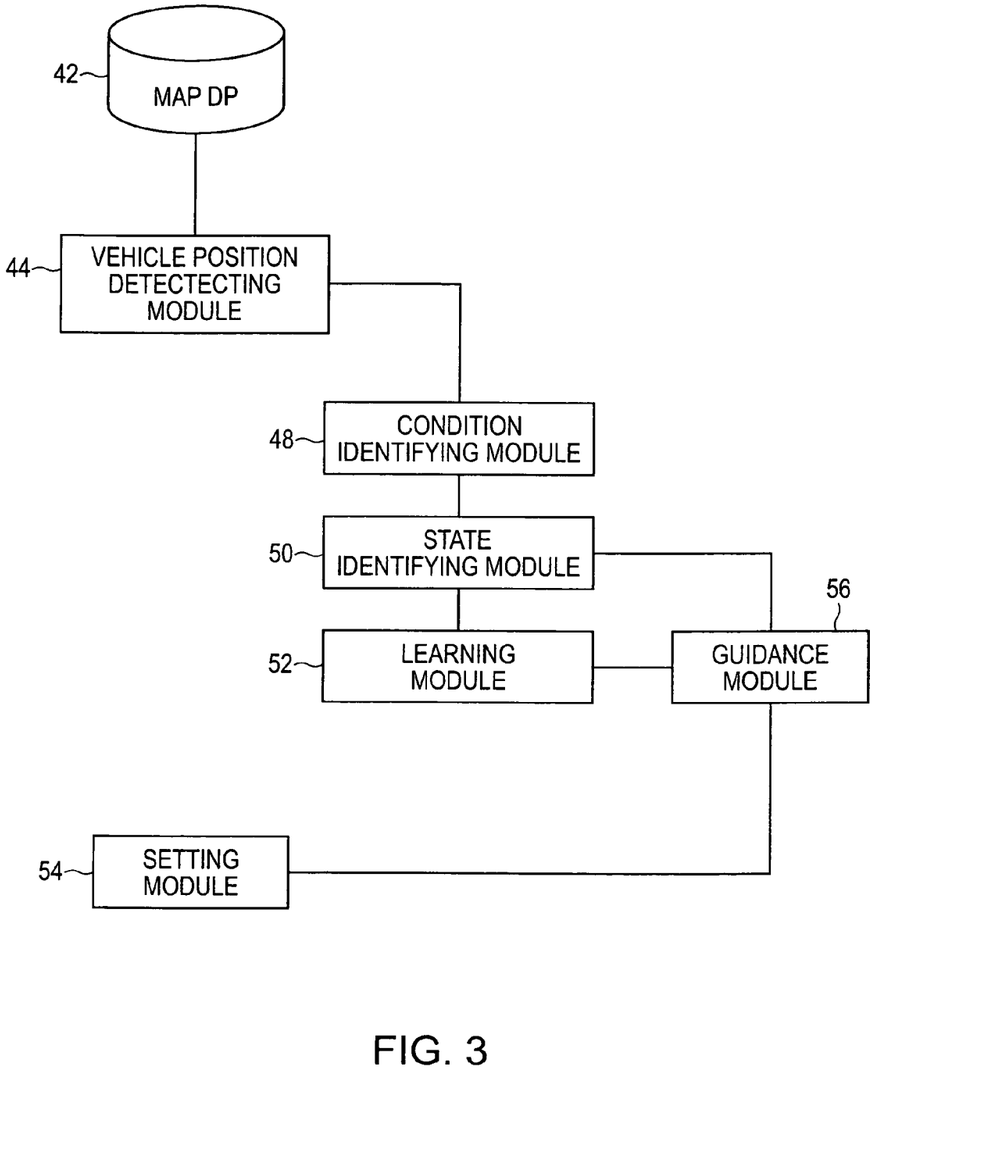
FIG. 3 shows an exemplary software configuration.

FIG. 3 is a block diagram showing an exemplary software configuration, for example, usable by or as part of the control program of the navigation system.

A map DB 42 may be a database including, for example, data that digitally represents maps in a graphical format. The map DB 42 may be used, for example, to detect the position of the vehicle in a road system, detect the number of lanes, and/or provide guidance about the driving conditions when merging onto a highway. The map DB 42 may include information regarding links and nodes. In addition, for each link, distance, speed limits, the number of lanes, and/or the type of road (for example, a highway or a general-use road) may be defined as attribute data. For each node, for example, the presence or absence of a traffic signal and/or other intersection information may be defined as attribute data.

A vehicle position detecting module 44 may be a program unit that, for example, enables the controller 20 to function as a condition detecting device. The vehicle position detecting module 44 may enable calculation of the position of the vehicle in a road system based on the latitude and longitude data of the current position of the vehicle input from the GPS unit 30, the travel speed input from the vehicle speed sensor 28, and/or the travel direction input from the direction sensor 26, while carrying out corrections by map matching using the map DB 42.

A condition identifying module 48 may be a program unit that, for example, enables the controller 20 to function as a condition identifying device. The condition identifying module 48 may enable identification that the vehicle is under the condition of entering the highway main traffic lanes, for example, based on the position of the vehicle in a road system, the communication timing between the ETC unit 23 and the entrance toll gate of the highway, and/or the position of the ramp divider area that is recognized by the images input from the camera unit 34. Note that additional elements that identify the condition in which the vehicle is operating may also or alternatively include, for example, the banking of the road, external air temperature, the illumination of the road, an amount of rainfall, the road width, the number of lanes, and/or the degree of curvature of a curve.

A state identifying module 50 may be a program unit that, for example, enables the controller 20 to function as an actual state detecting device. The state identifying module 50 may enable the recognition of the position and speed of nearby vehicles with respect to the driver's vehicle, the position of lane markers with respect to the driver's vehicle, and/or the position of ramp divider areas with respect to the driver's vehicle, based on, for example, images output by the camera unit 34 and/or position data for obstacles (vehicles, walls, etc.) output by the radar unit 32.

In addition, the state identifying module 50 may enable the recognition of the speed and steering angle of the driver's vehicle based on, for example, the speed data output by the vehicle speed sensor 28 and the steering angle data output by the steering angle sensor 24. The position and speed of nearby vehicles with respect to the driver's vehicle, the position of the lane markers with respect to the driver's vehicle, the position of the ramp divider areas with respect to the driver's vehicle, the speed of the driver's vehicle, and/or the steering angle of the driver's vehicle may indicate the type of vehicle control that is being carried out under the condition in which the vehicle is operating, and are parameters that represent the actual vehicle control state. Additionally, the amount of pressure on the pedals (such as the accelerator pedal), the positions of the shift lever and the parking lever, the output of the direction sensor, the engine revolutions, and/or the distance between obstacles and the vehicle can also serve as parameters that represent the vehicle control state.

A guidance module 56 may be a program unit that enables the controller 20 to function as an appropriate state specifying device and/or a guidance device. The guidance module 56 enables the output to the speaker 14 of, for example, guidance audio and warning audio by generating guidance audio data by combining the audio data for each sentence element, consisting of words, phrases, and the like, and generating a composite display of map images that show the road surface of the merging point of the highway and arrows that show the merging route.

The guidance module 56 enables the generation of driving guidance data and/or warning data according to the level of the driving skills of the driver and the guidance mode based on the result of comparing the actual vehicle control state and a predetermined appropriate vehicle control state for the vehicle control state while entering the highway main traffic lanes. The actual vehicle control state may be formed by, for example, the position and speed of nearby vehicles with respect to the driver's vehicle, the position of the lane markers with respect to the driver's vehicle, the position of the ramp divider area with respect to the driver's vehicle, the speed of the driver's vehicle, and/or the steering angle of the driver's vehicle. Note that in addition to images and audio, the driving guidance may also be provided to the driver by vibrations of, for example, the steering wheel, accelerator pedal, and/or the shift lever.

The learning module 52 may be a program unit that enables the controller 20 to function as a learning device. The learning module 52 may enable the determination of the level of the driving skills of the driver while entering the highway main traffic lanes based on, for example, the results of comparing the vehicle control state that actually occurs while entering the highway main traffic lanes to an appropriate vehicle control state that should occur while entering the highway main traffic lanes and/or the output frequency of warnings output while entering the highway main traffic lanes. The level of the driving skills of the driver may be determined, for example, for each condition irrespective of the location, such as "entering the highway main traffic lanes," "tandem parking," and "lane changing," or may be determined for each condition in which the vehicle is being operated at a particular location such as "entering the highway main traffic lanes at XX-interchange" or "tandem parking in space number XX at XX-parking." Furthermore, the level of the driving skills of the driver may be identified by categorizing the conditions for one or more detailed road characteristic such as the length of the acceleration lane, the acceleration lane shape (parallel or not parallel to the main traffic lanes), or the profile of the main traffic lanes at the merging point (curve, number of lanes).

The setting module 54 may enable the reception of the setting operation of the guidance mode by the driver and may enable the setting of the guidance mode according to this setting operation.

Figure 1:
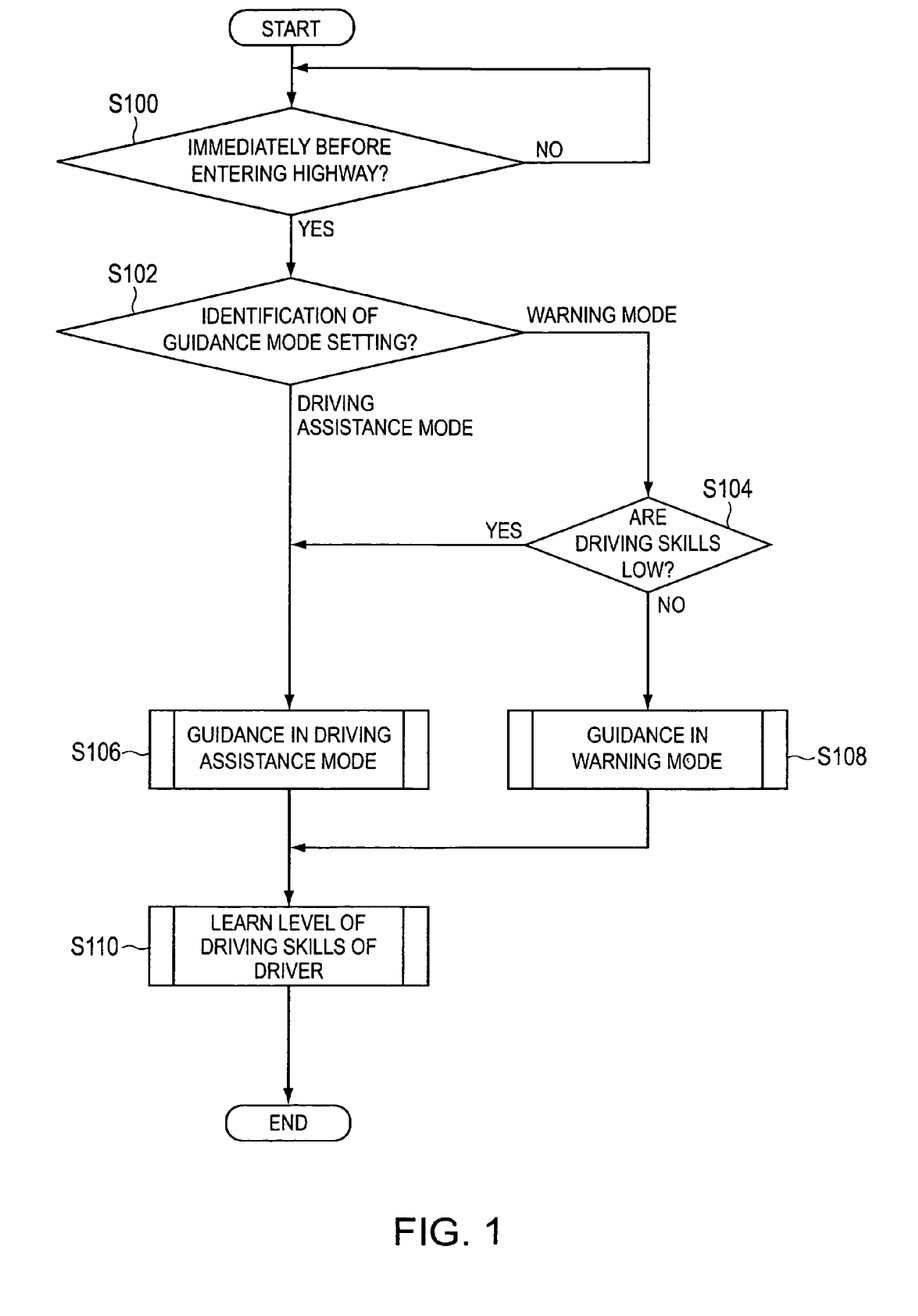
FIG. 1 shows an exemplary navigation method.

FIG. 1 is a flowchart showing an exemplary navigation method. The method shown in FIG. 1 may be repeatedly executed during travel, for example, by the controller 20 executing the control programs. The exemplary method may be implemented, for example, by one or more components of the above-described navigation system. However, even though the exemplary structure of the above-described navigation system may be referenced in the description, it should be appreciated that the structure is exemplary and the exemplary method need not be limited by any of the above-described exemplary structure.

As shown in FIG. 1, in step S100, the navigation system may determine whether the vehicle is about to enter the highway. Specifically, the controller 20 may determine that the vehicle will presently enter the highway by, for example, the location of the vehicle in the road system, passage through a highway entrance tollgate, and/or the input of highway entrance assistance instructions by the driver.

In step S102, the navigation system may determine the guidance mode that has been set by the driver. Specifically, the controller 20 may read the settings of the guidance mode, and may determine whether the guidance mode is set to a warning mode in which only collision avoidance warnings are output or whether the guidance mode is set to a driving assistance mode in which, for example, necessary driving guidance for entering the highway main traffic lanes is output.

When the warning mode has been set, the navigation system may determine whether the level of the driving skills of the driver is low (step S104). Specifically, the controller 20 may read the settings of the level of the driving skills of the driver in past conditions learned by the navigation system that are similar to the present condition and may determine whether the level of the driving skills is low. If the level of the driving skills of the driver is low, operation may proceed to step S106, so that guidance and warnings identical to those of the driving assistance mode may be output even when only the warning mode has been set.

Figure 4:
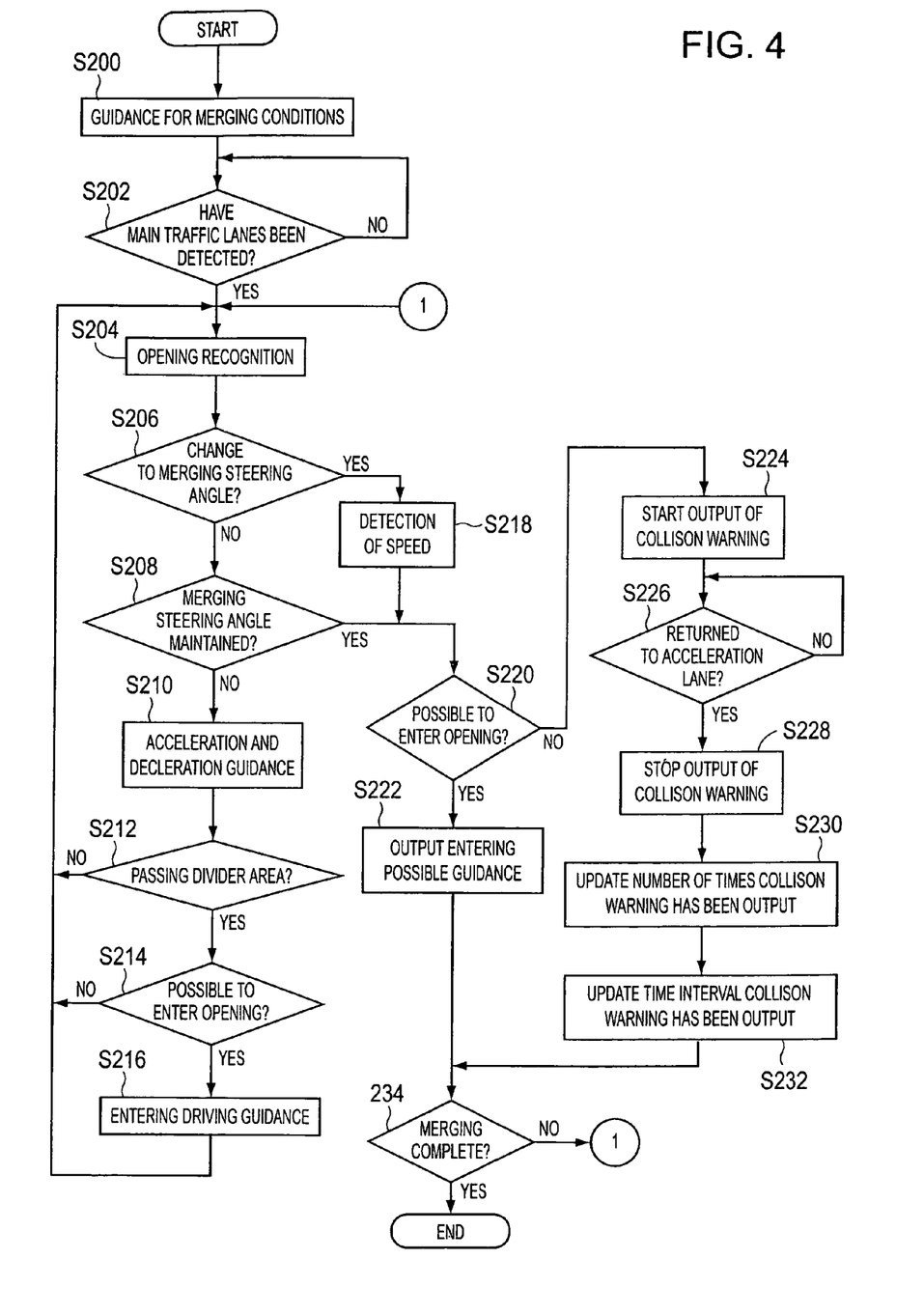
FIG. 4 shows an exemplary navigation method.

In step S106, the navigation system may operate in the driving assistance mode, (for example as shown in FIG. 4) and may display images that show the condition of merging into the highway main traffic lanes, and/or, may output necessary driving guidance and warnings for entering the highway main traffic lanes.

FIG. 4 shows an exemplary method of providing driving assistance. The exemplary method may be implemented, for example, by one or more components of the above-described navigation system. However, even though the exemplary structure of the above-described navigation system may be referenced in the description, it should be appreciated that the structure is exemplary and the exemplary method need not be limited by any of the above-described exemplary structure.

Figure 5:
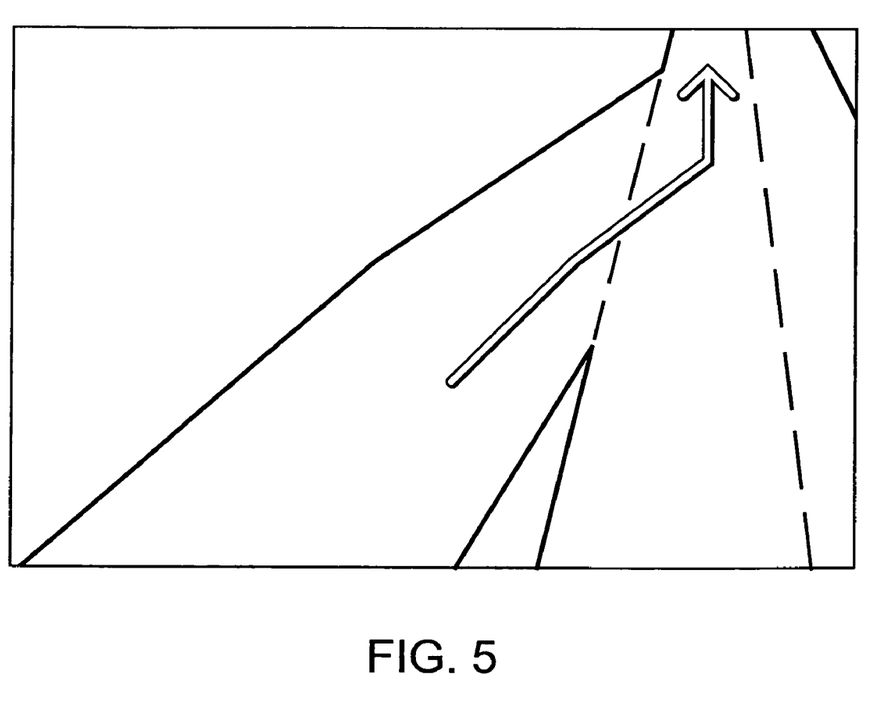
FIG. 5 is a schematic drawing showing an exemplary navigation screen.

As shown in FIG. 4, in step S200, the navigation system may provide guidance to the driver about the conditions of the merging into the highway main traffic lanes. Specifically, the controller 20 may display on the screen of the display 12 images (refer to FIG. 5) showing the connection condition between the highway main traffic lanes and the acceleration lane that the driver's vehicle will presently enter, and may output guidance audio such as, for example, "Your vehicle will merge into the left lane of the highway ahead. Because the acceleration lane is short, your vehicle must accelerate on the ramp before entering the acceleration lane."

In step S202, the navigation system may repeatedly attempt to detect the highway main traffic lanes until the highway main traffic lanes are detected. Specifically, the controller 20 may repeat a process of detecting lane markers of the highway main traffic lanes, for example, based on video images of the area on the side of and in front of the driver's vehicle that are output by the camera unit 34. In the merging state shown in FIGS. 6A and 6B, when passing a wall 80 that separates main traffic lanes 66 and an acceleration lane 60 of the ramp, images of lane markers 70 that separate a left lane 62 and a right lane 64 of the highway main traffic lanes 66 may be taken by the camera unit 34 of the area in front of a driver's vehicle 74 at a diagonal. As a result, the highway main traffic lanes 66 may be detected.

In step S204, the navigation system may recognizes an opening in the traffic that is traveling along the highway main traffic lanes. Specifically, the controller 20 may detect, for example, the position, speed, and/or length of the opening in the traffic that is traveling along the highway main traffic lanes based on the position data for nearby vehicles output by the radar unit 32.

Figure 6A:
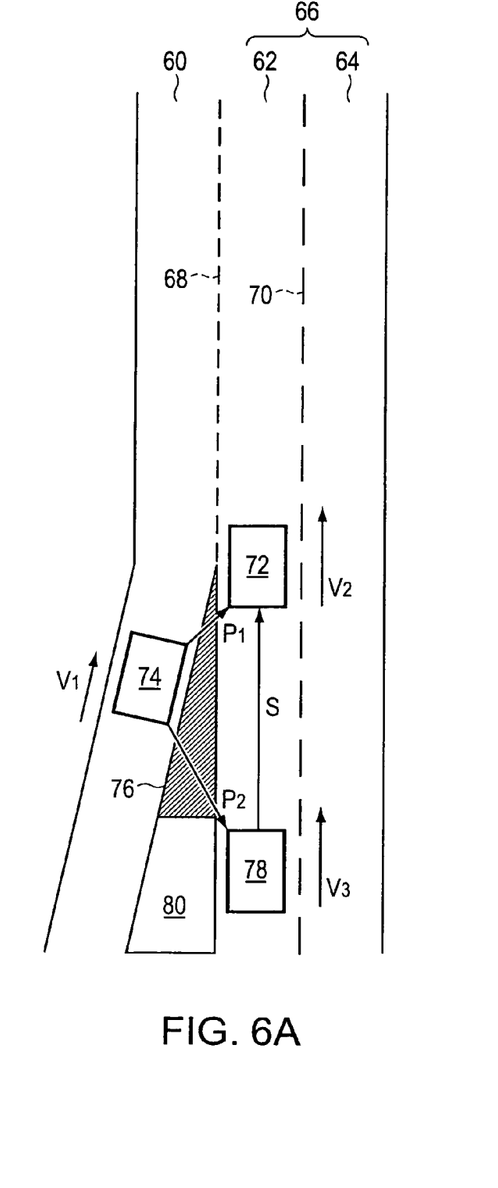
FIGS. 6A and 6B is a schematic drawing of exemplary driving situations.
Figure 6B:
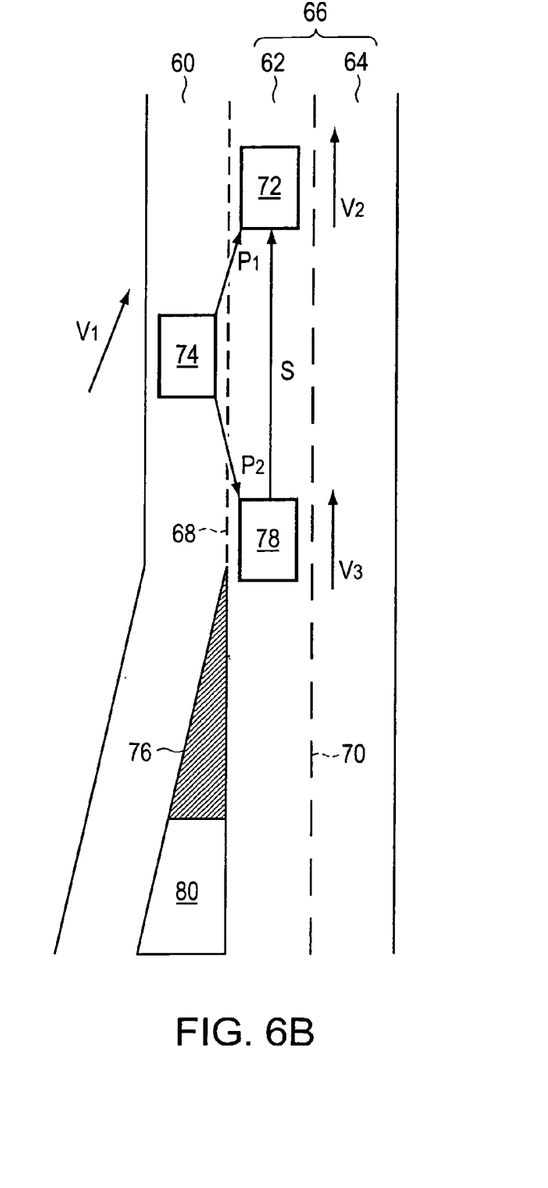

For example, with reference to FIGS. 6A and 6B, position data showing positions P1 of a vehicle 72 and P2 of a vehicle 78 with respect to the driver's vehicle 74 may be output by the radar unit 32. Here, the vehicles 72 and 78 are traveling in the left lane 62 of the highway main traffic lanes 66. The position of the opening may be determined based on the position P1 of the vehicle 72 in front and the position P2 of the vehicle 78 in back of the driver's vehicle 74. The speed of the opening may be determined as the speed of the vehicle at the front of the opening, the speed of the vehicle at the back of the opening, and/or can be found by differentiating the positions of these vehicles as a function of time. The length of the opening may be determined as the length of a vector S, using, for example, the position P2 as the origin and the position P1 as the endpoint.

In step S206, the navigation system may determine whether the steering angle for maintaining travel in the acceleration lane has changed to a merging steering angle for merging into the highway main traffic lanes. Specifically, for example, based on the output of the steering angle sensor 24, the controller 20 may determine that the steering angle for maintaining travel in the acceleration lane has changed to a steering angle for merging into the highway main traffic lanes when the steering angle has varied by a predetermined angle or more from a steering angle for forward travel within a predetermined time interval. In addition, for example, based on the road surface image in the area in front of and behind the driver's vehicle output by the camera unit 34, the controller 20 may determine that the steering angle for maintaining travel in the acceleration lane has changed to a steering angle for merging into the highway main traffic lanes, for example, when the driver's vehicle begins to cross the lane markers that separate the main traffic lanes and the acceleration lane or when the difference between the direction of forward travel of the vehicle and the direction of the lane markers fluctuates significantly more than a predetermined value within a predetermined time interval. The timing at which the controller 20 determines that the steering angle for maintaining travel in the acceleration lane has changed to a steering angle for merging into the highway main traffic lanes may serve as the timing at which the vehicle enters the main traffic lanes of the highway.

If the steering angle for maintaining travel in the acceleration lane has changed to the merging steering angle for merging into the highway main traffic lanes, the navigation system may detect the speed of the driver's vehicle (step S218), for example, in order to determine the level of the driving skills of the driver by comparing the appropriate speed under the condition in which the vehicle is entering the main traffic lanes of the highway and the actual speed at this time. In addition, at this time, it may be determined whether the turn signal is flashing to determine the level of the driving skills of the driver.

When it has been determined in step S206 that the steering angle for maintaining travel in the acceleration lane has not changed to a merging steering angle for merging into the highway main traffic lanes, the navigation system may determine whether the merging steering angle is being maintained (step S208). Naturally, when travel in the acceleration lane is being maintained, it is determined in step S206 that the steering angle for maintaining travel in the acceleration lane has not changed to the merging steering angle for merging into the highway main traffic lanes, and then in step S208 as well, it is determined that the merging steering angle is not being maintained.

When continuing to attempt to merge into the highway main traffic lanes after changing to the merging steering angle, the navigation system may determine that the merging steering angle is being maintained. Specifically, for example, based on the output of the steering angle sensor 24, the controller 20 may determine that the merging steering angle is being maintained if the steering angle variation range after changing to the steering angle for merging into the highway main traffic lanes is within a predetermined range. In addition, for example, based on the road surface images in the area in front of and behind the driver's vehicle output by the camera unit 34, the controller 20 may determine that the merging steering angle is being maintained if the difference between the direction of forward travel of the driver's vehicle and the direction of the lane markers is within a predetermined range.

When the merging steering angle is not maintained, the navigation system may outputs guidance urging the driver to accelerate or to decelerate (step S210). Specifically, for example, the controller 20 may acquire the speed of the driver's vehicle from the output of the vehicle speed sensor 28, may acquire from the map DB 42 the legal speed limit of the highway main traffic lanes that the vehicle is presently attempting to enter, may calculate the appropriate speed for entering safely into an opening in the traffic from the driver's vehicle speed, the legal speed limit of the highway main traffic lanes, and the position, speed, and length of the opening in the traffic that is traveling along the highway main traffic lanes, and may determines whether acceleration or deceleration is necessary depending on the difference between the calculated appropriate speed and the current speed of the driver's vehicle. When the controller 20 has determined that acceleration or deceleration is necessary, the speaker 14 may output guidance audio urging acceleration or deceleration and/or a guidance screen urging acceleration or deceleration may be displayed on the display 12.

In step 212, the navigation system may determine whether the driver's vehicle is passing a ramp divider area (e.g., 76 in FIGS. 6A and 6B). Specifically, the controller 20 may determines whether the driver's vehicle is passing a ramp divider area by detecting and tracking the ramp divider area based on road surface images in front of, at the side of, and/or behind the driver's vehicle that are output by the camera unit 34. Until the vehicle has passed a ramp divider area, the condition may not be considered not one in which the vehicle can safely enter the highway main traffic lanes from the acceleration lane. Thus, the navigation system may outputs a warning when a vehicle control state for entering the highway main traffic lanes has been detected before the ramp divider area has been passed.

In step S214, the navigation system may determine whether it is possible to merge into the opening in traffic flow traveling along the highway main traffic lanes. Specifically, for example, when one or more or all of the following conditions have been satisfied, the controller 20 may determine that it is possible to merge into the opening: (1) the speed of the driver's vehicle is equal to or greater than the minimum legal speed limit; (2) the length of the opening in traffic is sufficient; (3) the distances between the vehicles at the front and back of the opening and the driver's vehicle are sufficiently great; (4) the absolute speed of the vehicle at the front of the opening is higher than the absolute speed of the driver's vehicle or the difference between the absolute speed of the vehicle at the front of the opening and the speed of the driver's vehicle is sufficiently small; (5) the absolute speed of the vehicle at the back of the opening is lower than the speed of the driver's vehicle or the difference between the absolute speed of the vehicle at the front of the opening and the speed of the driver's vehicle is sufficiently small.

The parameters described above, which may be used for the determination of the conditions, may be calculated from the position data output by the radar unit 32. In addition, the determination can be carried out based on the difference between predetermined appropriate values (for example, the distance between the vehicles at the front of and at the back of the opening and the driver's vehicle=50 m) and the values of the parameters described above calculated from the position data output by the radar unit 32. The appropriate values used in this determination are parameters indicating an appropriate vehicle control state when the vehicle is entering the highway main traffic lanes. The appropriate values can also be represented by the code of a control program, and recorded as link attributes in the map DB 42.

When it is possible to merge into the opening in the traffic traveling along the highway main traffic lanes, the navigation system may output driving guidance urging the driver to enter the highway main traffic lanes (step S216). Specifically, for example, the controller 20 may display in the display 12 an arrow urging the driver to steer towards the highway main traffic lanes and/or may output audio guidance from the speaker 14, such as: "It is possible to merge into traffic. Please enter the main traffic lanes." Note that the driving guidance may be content that provides specific guidance about appropriate driving (for example, "Please turn the steering wheel a little to the right"), or may be content that explains a condition in order to urge appropriate driving (for example, "It is possible to merge into traffic.").

When the steering angle for maintaining travel in the acceleration lane is changed to the merging steering angle for merging into the highway main traffic lanes and the merging steering angle is being maintained (when a positive determination has been made in step S208), similar to step S214 described above, the navigation system may determine whether it is possible to merge into the opening in the traffic traveling along the highway main traffic lanes (step S220).

When it is possible to merge into the opening in the state of maintaining the merging steering angle, the navigation system may outputs guidance (this guidance is also driving guidance) indicating that the condition is one in which entering the traffic flow is possible (step S222). Specifically, for example, the controller 20 will output from the speaker 14 guidance audio, such as "Continue to merge."

When it is not possible to merge into the opening in the state of maintaining the merging steering angle, the navigation system may begin to output collision warnings (step S224). Specifically, the controller 20 may start outputting from the speaker 14 warning sounds and warning audio (for example, "Danger! Return to the acceleration lane!"), and may start flashing the screen of the display 12.

The navigation system may repeat outputting the collision warnings until the driver's vehicle has returned to the acceleration lane (steps S226 and S228). Specifically, for example, the controller 20 may track the lane markers and steering angle and may detect the state in which the driver's vehicle returns to the acceleration lane by analyzing the road surface images output by the camera unit 30 and steering angle data output by the steering angle sensor 24.

When the vehicle returns to the acceleration lane, the navigation system may update the number of output occurrences and the output time interval of the collision warnings (step S230). Specifically, for example, from the time that the processing shown in FIG. 4 is activated until the processing has been completed, which specifically corresponds to entering the highway one time, the controller 20 may accumulate and add the number of output occurrences and the output time interval to serve as the output frequency of the collision warnings. The output time interval is the time interval from the start of the output of the collision warnings (step S224) until the suspension of the output of the collision warnings (step S228). The number of output occurrences of the collision warning is the number of times that the output has been started. For example, assuming that the driver returns to the acceleration lane after failing when attempting to enter the main traffic lanes and successfully enters the main traffic lanes on the third attempt, and assuming that the collision warning is output for 2 seconds each on the first attempt and the second attempt, then the accumulated number of output occurrences for the warnings is two times, and the accumulated output time interval for the warnings is 4 seconds. The number of occurrences and the time intervals of the output collision warnings may be used to determine the level of the driving skills of the driver under the condition in which the vehicle is entering the highway main traffic lanes.

In step S234, the navigation system may determine whether the merging has been completed. Specifically, the controller 20 may, for example, track the lane markers based on the road surface images in front of and behind the driver's vehicle, which are output by the camera unit 34, and may thereby determine whether the driver's vehicle is traveling in the main traffic lanes. The controller 20 may also determine whether the driver's vehicle has entered the traffic flow of the highway main traffic lanes based on, for example, the position data of nearby vehicles output by the radar unit 32. When the merging has been completed, the navigation system may end the driving guidance in the driving assistance mode.

Returning to FIG. 1, if in step S104, the level of the driving skills of the driver are not low, operation may proceed to step S108, so that guidance in the warning mode may be provided.

Figure 7:
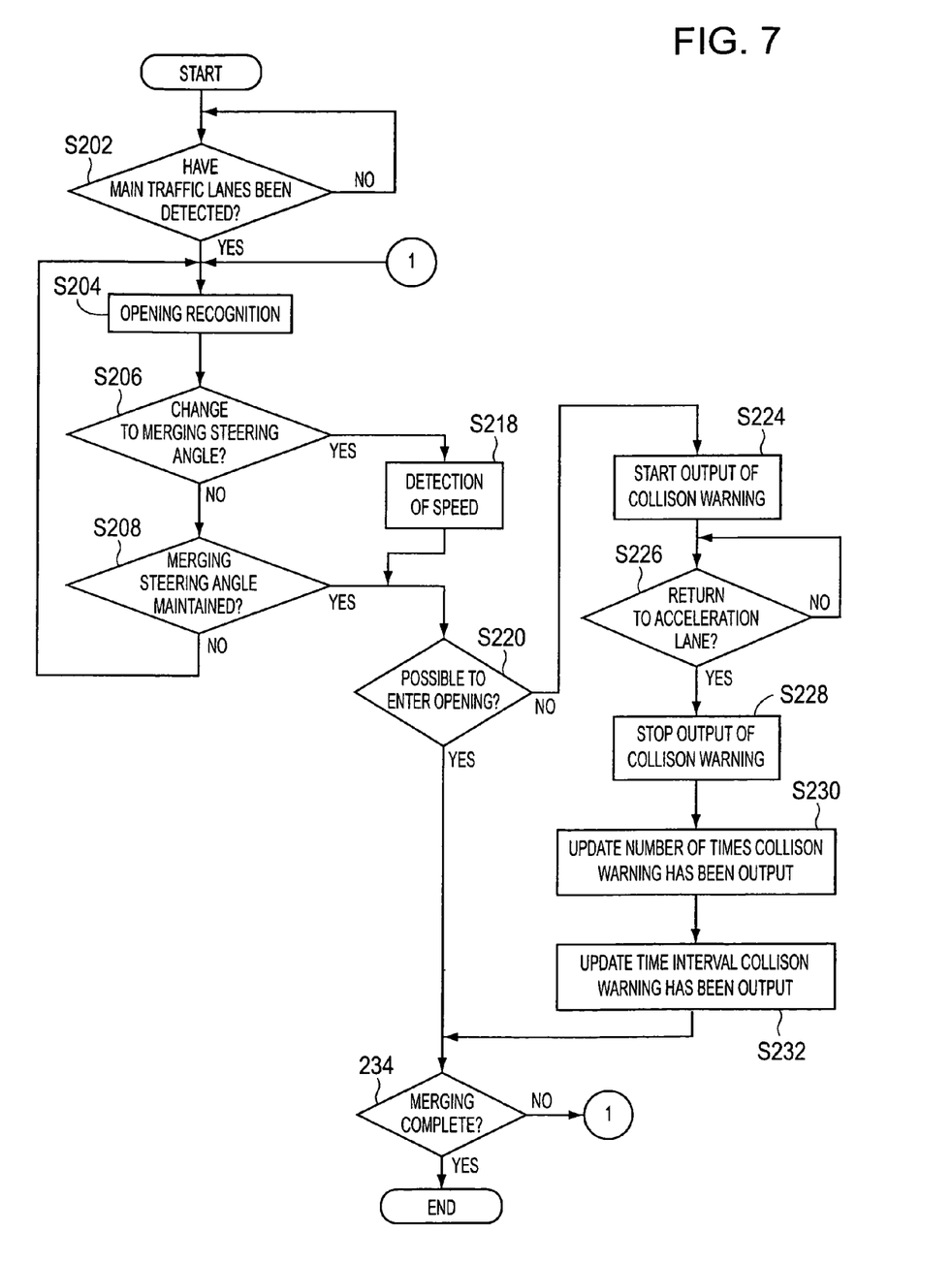
FIG. 7 shows an exemplary navigation method.

FIG. 7 shows an exemplary method of performing guidance in the warning mode. The exemplary method may be implemented, for example, by one or more components of the above-described navigation system. However, even though the exemplary structure of the above-described navigation system may be referenced in the description, it should be appreciated that the structure is exemplary and the exemplary method need not be limited by any of the above-described exemplary structure.

In FIG. 7, processing that is similar to the processing shown in FIG. 4 is denoted by identical reference symbols. Thus, a description thereof is omitted. In the warning mode, the navigation system may not output driving guidance that urges the driver to enter the highway main traffic lanes, but may only outputs warnings when there is a danger of a collision. Note that in the warning mode as well, the driving guidance that is displayed on the screen in the driving assistance mode may be displayed on the screen. That is, the manner in which the driving guidance is executed may be changed in the warning mode and in the driving assistance mode in a freely selected manner. Under similar conditions, the frequency of the driving guidance during the warning mode may be lower than the driving guidance during the driving assistance mode. Thus, during warning mode, the caution alert level during driving guidance may be low.

Returning to FIG. 1, after steps S106 and S108, operation proceeds to step S110 where the level of driving skills of the driver is learned/updated, for example, when the vehicle has completed entering the highway main traffic lanes.

Figure 8:
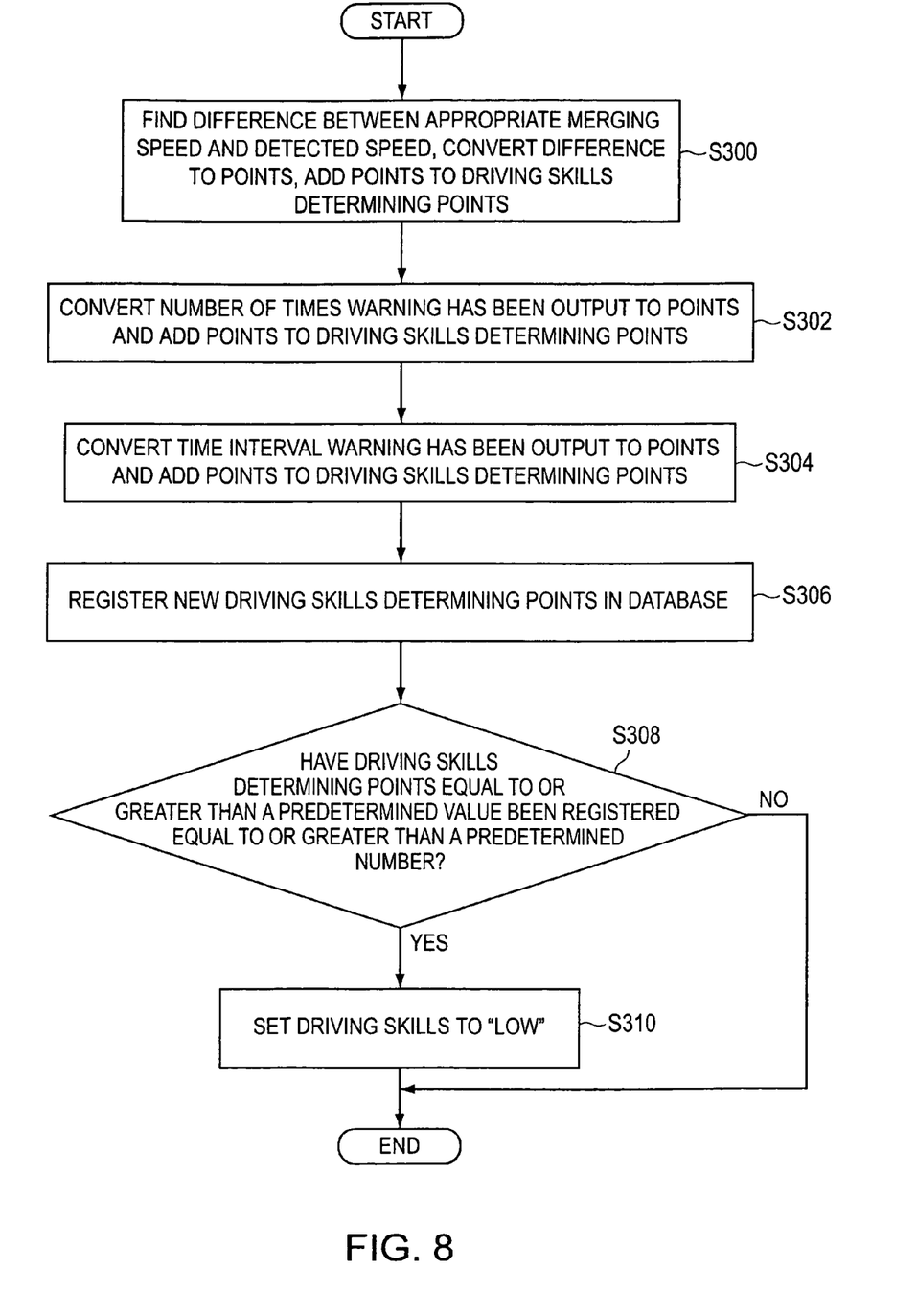
FIG. 8 shows an exemplary navigation method.

FIG. 8 shows an exemplary method for learning/updating the driving skills of the driver. The exemplary method may be implemented, for example, by one or more components of the above-described navigation system. However, even though the exemplary structure of the above-described navigation system may be referenced in the description, it should be appreciated that the structure is exemplary and the exemplary method need not be limited by any of the above-described exemplary structure.

As shown in FIG. 8, in step S300, the navigation system may find the difference between the appropriate merging speed and the detected actual speed, converts this difference to points, and adds the points to the driving skill determining points. Specifically, the controller 20 may find, for example, the difference between the speed detected in step S218 and the appropriate merging speed when the steering angle has been changed to the merging steering angle. The appropriate merging speed may be found, for example, by the acceleration and deceleration guidance in step S210, and is the appropriate speed for safely entering the opening. The appropriate merging speed may also be a predetermined specified value (for example, 25 m/s).

Next, the controller 20 may convert the difference between the appropriate merging speed and the detected actual speed into stepwise evaluation points, and may add the result to the driving skills determining points. For example, if the actual merging speed is equal to or greater than 10 m/s slower than the appropriate merging speed, each time the actual speed becomes 5 m/s slower than the appropriate speed, one point may be added to the driving skills determining points. The driving skills determining points are reset to zero each time the vehicle enters the highway main traffic lanes. According to this example, a higher number of points represents a lower level of driving skills.

In step S302, the navigation system may convert the number of output warning occurrences to points, and may add these points to the driver skills determining points. Specifically, the controller 20 may convert to, for example, 1 point each one of the occurrences of the output warnings that have been accumulated and added in step S230, and may add the result to the driving skills determining points. Of course, the number of output warning occurrences may be a weighted evaluation.

In step S304, the navigation system may convert the warning output time interval to points, and may add the points to the driving skills determining points. Specifically, the controller 20 may convert to, for example, 1 point each second of the warning output time intervals accumulated and added in step S232, and may add the points to the driving skills determining points. Of course, the warning output time interval may be a weighted evaluation.

In step S306, the navigation system may record the new driving skills determining points in the database. Specifically, the controller 20 may store in the flash memory 18 or the memory 16 the driving skills determining points added for the condition immediately prior to the vehicle entering the highway main traffic lanes in association with the conditions (for example, merging onto a highway, position, topography), time and date, and the like.

In step S308, the navigation system may determine whether driving skills determining points equal to or greater than a predetermined value have been registered in the database a predetermined number of times or more for the condition in which the vehicle enters the highway main traffic lanes. Specifically, the navigation system may determine the level of the driving skills of the driver under the condition in which the vehicle is entering the highway main traffic lanes. In the case of a positive determination, the driving skills are set to "low" (step S310). Specifically, the controller 20 may search the database using the condition (for example, merging onto the highway) and driving skills determining points as search keywords, obtains the number of records matching the search conditions, and determines whether this number is equal to or greater than a predetermined value.

Note that the type of format in which the driving skills are recorded may be freely selected. For example, the driving skills may be recorded in the database in a binary format each time, or the driving mode may be recorded in a table in which the driving skills are updated with binary values for each condition. In addition, the level at which it may be determined that the driving skills are low is arbitrary. For example, it may be determined that the level of the driving skills is low if the total sum of the driving skills determining points recorded in the database for a specified condition is equal to or greater than a predetermined value.

In addition, the navigation system may determine the driving skills for several drivers. In this case, processing to identify drivers (for example, inputting IDs for the drivers while riding in the vehicle) becomes necessary, and the navigation system may store each driver's driving skills determining points in association with the respective driver. The navigation system may also determine the driving skills for several time periods. Additionally, for a condition in which the vehicle is being operated at a site where the driver has no prior driving experience, the navigation system may anticipate the driving skills of a driver. Specifically, for example, for the condition "immediately before merging onto a highway" or the condition "immediately before entering a highway from an acceleration lane that is not parallel to the main traffic lanes," if the level of the driving skills have been learned, appropriate driving guidance according to the level of the driving skills of the driver can be output even for conditions in which the vehicle is traveling along an acceleration lane of a highway on which the driver has no prior experience of traveling.

As explained above, by learning the level of the driving skills of the driver under the condition in which the vehicle is entering the highway main traffic lanes and by changing the mode in the driving guidance according to the learned level of driving skills under the condition in which the vehicle is entering the highway main traffic lanes, it is possible to prevent outputting driving guidance from the navigation system that would annoy a driver having a high level of driving skills. In addition, it is possible to provide detailed driving guidance that aids in the safe driving of a driver who has low driving skills.

In the above examples, merging assistance under the condition in which the vehicle is merging into highway main traffic lanes is described. However, the broad principles underlying the example may also be applied, for example, to parking assistance under the condition in which the vehicle is entering a parking space, to lane change assistance under the condition in which the vehicle is changing lanes, to right turn assistance under the condition in which the vehicle is making a right turn, to slope starting assistance under the condition in which the vehicle is starting to travel up a hill, and/or to U-turn assistance under the condition in which the vehicle is making a U-turn on a road where many traffic accidents have occurred.

Note that, for example, to the extent interference is not caused in terms of the technology, the order of each of the actions of the method recited in the claims is not limited by the order recited above. The actions may be carried out in any order or may be carried out simultaneously. In addition, each of the functions of the plurality of described devices, sensors, and or units may be realized by one or more hardware resources in which the functions are embodied by the hardware itself, by one or more hardware resources under the controller of a controller, by hardware resources in which the functions are embodied by programs executed by a controller, and/or any combination thereof. In addition, each of the functions of the plurality of devices may not be limited to being realized by hardware resources that are physically independent from each other. In addition, the present invention may be specified either as an invention including programs or as one including a recording medium on which the programs are recorded.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A navigation system for a vehicle, comprising:
   a controller that:
      identifies that the vehicle is in a predetermined specified condition based on information detected by a condition detecting device;
      detects an actual vehicle control state under the specified conditions based on information detected by an actual state detecting device;
      specifies an appropriate vehicle control state according to the specified conditions;
      determines a level of driving skills of a driver of the vehicle under the specified conditions based on the actual vehicle control state and the appropriate vehicle control state;
      determines a guidance mode set by the driver between a warning mode in which only warnings are output and a driving assistance mode in which necessary driving guidance is output;
      determines whether the level of driving skills of the driver is below a predetermined level if the driver selects the warning mode; and
      outputs the necessary driving guidance in the warning mode when the level of the driving skills of the driver is below the predetermined level.

2. The navigation system of claim 1, wherein the controller:
   determines if the actual vehicle control state is consistent with the appropriate vehicle control state;
   if the actual vehicle control state is inconsistent with the appropriate vehicle control state, outputs warnings; and
   determines the level of the driving skills based on an output frequency of the warnings.

3. The navigation system of claim 1, wherein the predetermined specified condition is the vehicle entering highway main traffic lanes.

4. The navigation system of claim 1, wherein the information detected by the actual state detecting device comprises the steering angle of the vehicle.

5. The navigation system of claim 1, wherein the information detected by the actual state detecting device comprises the speed of the vehicle.

6. The navigation system of claim 1, wherein the information detected by the actual state detecting device comprises the distance between the driver's vehicle and nearby vehicles.

7. The navigation system of claim 1, wherein the controller specifies the appropriate vehicle control state based on road data, the road data relating to roads in a vicinity of the vehicle, the road data stored in a memory.

8. The navigation system of claim 1, wherein:
   the information detected by actual state detecting device comprises a location and a speed of another vehicle traveling nearby the vehicle; and
   the controller specifies the appropriate vehicle control state based on the location and the speed of the other vehicle.

9. The navigation system of claim 1, wherein at least one of the condition detecting device and the actual state detecting device, comprises at least one of:
   a camera;
   a radar unit;
   a GPS receiver;
   a vehicle speed sensor;
   a direction sensor;
   a steering angle sensor; and
   a communicator that communicates with tollgates.

10. The navigation system of claim 1, further comprising:
    the condition detecting device; and
    the actual state detecting device.

11. A navigation method for a vehicle, comprising:
    identifying that the vehicle is in a predetermined specified condition based on information detected by a condition detecting device;
    detecting an actual vehicle control state under the specified conditions based on information detected by an actual state detecting device;
    specifying an appropriate vehicle control state according to the specified conditions;
    determining a level of driving skills of a driver of the vehicle under the specified conditions based on the actual vehicle control state and the appropriate vehicle control state;
    determining a guidance mode set by the driver between a warning mode in which only warnings are output and a driving assistance mode in which necessary driving guidance is output;
    determining whether the level of driving skills of the driver is below a predetermined level if the driver selects the warning mode; and
    outputting the necessary driving guidance in the warning mode when the level of the driving skills of the driver is below the predetermined level.

12. The navigation method of claim 11, further comprising:
    determining if the actual vehicle control state is consistent with the appropriate vehicle control state;
    outputting warnings, if the actual vehicle control state is inconsistent with the appropriate vehicle control state; and
    determining the level of the driving skills based on an output frequency of the warnings.

13. The navigation method of claim 11, wherein the predetermined specified condition is the vehicle entering highway main traffic lanes.

14. The navigation method of claim 11, wherein the information detected by the actual state detecting device comprises the steering angle of the vehicle.

15. The navigation method of claim 11, wherein the information detected by the actual state detecting device comprises the speed of the vehicle.

16. The navigation method of claim 11, wherein the information detected by the actual state detecting device comprises the distance between the driver's vehicle and nearby vehicles.

17. The navigation method of claim 11, further comprising:
specifying the appropriate vehicle control state based on road data, the road data relating to roads in a vicinity of the vehicle, the road data stored in a memory.

18. The navigation method of claim 11, wherein the information detected by actual state detecting device comprises a location and a speed of another vehicle traveling nearby the vehicle, the method further comprising:
specifying the appropriate vehicle control state based on the location and the speed of the other vehicle.

19. A storage medium storing a set of program instructions executable on a data processing device, the program instructions usable to implement the method of claim 11.

20. A navigation system for a vehicle, comprising:
means for identifying that the vehicle is in a predetermined specified condition based on information detected by condition detecting means;
means for detecting an actual vehicle control state under the specified conditions based on information detected by actual state detecting means;
means for specifying an appropriate vehicle control state according to the specified conditions;
means for determining the level of the driving skills of a driver of the vehicle under the specified conditions based on the actual vehicle control state and the appropriate vehicle control state;
means for determining a guidance mode set by the driver between a warning mode in which only warnings are output and a driving assistance mode in which necessary driving guidance is output;
means for determining whether the level of driving skills of the driver is below a predetermined level if the driver selects the warning mode; and
means for outputting the necessary driving guidance in the warning mode when the level of the driving skills of the driver is below the predetermined level.

21. The navigation system of claim 2, wherein the output frequency of the warnings includes one of a number of output occurrences and an output time interval.

22. The navigation system of claim 12, wherein the output frequency of the warnings includes one of a number of output occurrences and an output time interval.

* * * * *